Figure 1:
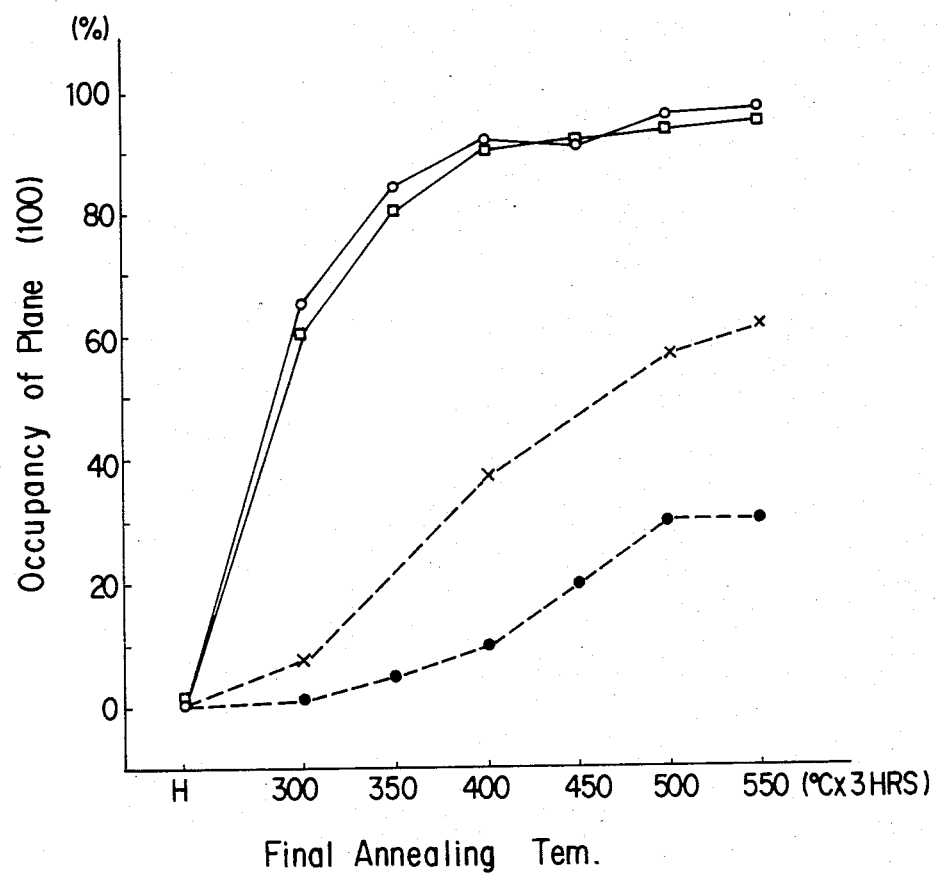

United States Patent [19]

Mehada et al.

[11] Patent Number: 4,510,207
[45] Date of Patent: Apr. 9, 1985

[54] COMPOSITE ALUMINUM FOIL FOR USE AS ELECTRODE IN ELECTROLYTIC CAPACITOR

[75] Inventors: Masashi Mehada, Matsubara; Shozo Yoshimura, Osaka; Kenshiro Yamaguchi, Nara; Osamu Iwao, Ashiya, all of Japan

[73] Assignee: Toyo Aluminium Kabushiki Kaisha, Osaka, Japan

[21] Appl. No.: 537,562

[22] Filed: Sep. 30, 1983

[30] Foreign Application Priority Data

Oct. 5, 1982 [JP] Japan .................... 57-174959
Mar. 15, 1983 [JP] Japan .................... 58-43811

[51] Int. Cl.³ ................................ C22F 1/04
[52] U.S. Cl. ............................ 428/607; 428/654; 148/438
[58] Field of Search ............... 428/607, 654, 611; 148/437, 438

[56] References Cited

U.S. PATENT DOCUMENTS

| | | | |
|---|---|---|---|
| 2,383,511 | 8/1945 | Reynolds | 428/654 |
| 2,726,436 | 12/1955 | Champion | 428/654 |
| 3,716,419 | 2/1973 | Boutin | 148/11.5 A |
| 3,878,871 | 4/1975 | Anthony et al. | 428/654 |
| 4,172,181 | 10/1979 | Kawase et al. | 428/654 |
| 4,214,041 | 7/1980 | Fister et al. | 428/607 |

FOREIGN PATENT DOCUMENTS

| | | | |
|---|---|---|---|
| 741837 | 11/1943 | Fed. Rep. of Germany | 428/654 |
| 865155 | 1/1953 | Fed. Rep. of Germany | |
| 1087279 | 2/1961 | Fed. Rep. of Germany | |
| 1172922 | 6/1964 | Fed. Rep. of Germany | 428/654 |
| 62525 | 8/1971 | Japan | |
| 54044 | 5/1972 | Japan | |
| 62581 | 5/1977 | Japan | |
| 83788 | 6/1980 | Japan | |
| 174149 | 12/1980 | Japan | |

*Primary Examiner*—L. Dewayne Rutledge
*Assistant Examiner*—John J. Zimmerman
*Attorney, Agent, or Firm*—Oblon, Fisher, Spivak, McClelland & Maier

[57] ABSTRACT

Described is a composite aluminum foil for use as an electrode in an electrolytic capacitor, having an aluminum core layer of purity greater than 99.995% clad on each side with an aluminum outer layer of purity 99.0 to 99.99%, which has a rich proportion of a cubic texture, i.e., a predominant occupancy of the crystallographic plane of Miller indices (100) substantially parallel to the surface of the foil. The core layer may contain both or either of copper and iron in an amount of 10 to 40 ppm.

14 Claims, 10 Drawing Figures

COMPOSITE ALUMINUM FOIL FOR USE AS ELECTRODE IN ELECTROLYTIC CAPACITOR

This invention relates to an aluminum foil for use as an electrode in an electrolytic capacitor, and more particularly, to a composite aluminum foil for the same use, which consists of a relatively high pure aluminum core sandwiched with a relatively low pure aluminum clad and which has a rich proportion of a cubic texture.

The cubic texture is one of the recrystallized structures observed in an aluminum foil after the final recrystallization annealing in a normal manufacturing process therefor. In this texture, the crystals are oriented in such a way that their crystallographic plane of Miller indices (100) is substantially parallel to the foil surface, while their crystallographic direction of Miller indices [010] is substantially parallel to the direction in which the foil is rolled.

It is well known that when there is a high proportion of the cubic texture in the aluminum foil, that is, when there are a great number of crystallographic plane of Miller indices (100) parallel to the foil surface in the aluminum foil, the electrostatic capacitance of the electrolyte capacitor may be increased by disposing such an aluminum foil after etching as an electrode. This is because the plane of Miller indices (100) has a much greater resistance to the corrosion than other crystallographic planes, and the finer scale tunnel networks of etching pits can be advantageously developed in the foil rich in such a plane (100) to enhance the effective surface area of the foil electrode. Therefore, the large occupancy of the crystallographic plane of Miller indices (100) in the aluminum foil is commonly understood to be one of the conditions to increase the electrostatic capacitance of the electrolytic capacitor.

In the aluminum foil with a purity greater than 99.999%, the occupancy of the plane (100) is generally very much higher than in the aluminum with purity less than 99.99% after the final rolling or annealing. However, as this high purity foil softens during the rolling step and loses its mechanical strength, the rolling operation is often troublesome and it is extremely difficult to obtain a foil which has the desired properties as electrodes. Generally speaking, the lower the purity of the aluminum is or the thinner the foil becomes, the occupancy of the plane of Miller indices (100) tends to fall down.

The addition of an intermediate annealing to a cold rolling stage was previously suggested as a means for increasing the occupancy of the plane (100) mentioned in the foregoings. In Japanese Patent Publication No. 11242/79, it is disclosed that a hot rolled aluminum strip or sheet is cold rolled with a very high cold-working rate of more than 1000%, then subjected to a special intermediate annealing operation at a temperature of 180° to 350° C., cold rolled again with a low cold-working rate of 5 to 35%, and subjected to the final annealing or recrystallization annealing at 300° to 650° C. so as to produce an aluminum strip with a higher proportion of cubic texture. In Japanese Patent Laying Open No. 97614/82, it is disclosed that the aluminum material is first maintained at a temperature of 350° to 520° C. for 1 to 150 hours for separating out the dissolved atoms such as Fe, Si, etc., then rolled with reduction of greaer than 60%, subjected to a successive intermediate annealing step at a temperature of 200° to 380° C. for 0.5 to 150 hours, cold rolled again with reduction of 5 to 70% and subjected to a final annealing step at 350° to 640° C.

When trying to make improvement by addition of such intermediate annealing, however, the occupancy of the plane (100) varies largely with the position of the intermediate annealing step or a slight change in temperature. Besides, the properties and uniformity of the oxidized film on the surface produced during the intermediate annealing may also adversely affected.

In another prior art publication, Japanese Patent Publication No. 29943/81, it is disclosed that the formation of a cubic texture in the recrystallized structure is remarkably suppressed by iron in solid solution present in the aluminum foil as an impurity and that by the incorporation of 0.00005 to 0.005% Mn in aluminum of greater than 99.9% purity, the iron in the solid solution is separated out and the occupancy of the plane (100) is thereby increased. However, while the addition of alloying element Mn improves the occupancy of plane (100), the weight loss of the foil during etching may increase and the leakage current after formation may also increase.

Further, in German Pat. Nos. 1087279 and 865155 and U.S. Pat. No. 4,214,041, a composite aluminum foil for use as an electrode in an electrolytic capacitor is described while using the cladding techniques, but no mention at all is made of improving the occupancy of the plane of Miller indices (100). German Pat. No. 1087279 describes a multi-layer clad sheet wherein the etching proceeds along the interfaces between the layers. German Pat. No. 865155 describes that aluminum of purity 99.99% is clad on both sides thereof with aluminum of purity 99.8 to 99.85% and that the etching of the inner layer proceeds with difficulty. U.S. Pat. No. 4,214,041 describes a composite foil wherein an aluminun core of relatively low purity has an aluminum cladding of relatively high purity.

The object of the present invention is to provide a composite aluminum foil for use as an electrode in an electrolytic capacitor, which has a predominant proportion of a cubic texture, i.e., a high occupancy of the cyrstallographic plane of Miller indices (100) substantially parallel to the foil surface in the foil. The other object of the present invention is to provide a composite aluminum foil for the electrode which can enhance the electrostatic capacitance of the electrolytic capacitor. Another object of the present invention is to provide a composite aluminum foil for the electrode which has an enough mechanical strength besides the rich proportion of the cubic texture or high occupancy of the plane (100) in the foil. Further objects of the present invention will be apparent from the descriptions hereinafter mentioned.

The foil for the electrode according to this invention is a composite foil which has an aluminum core layer of purity greater than 99.995% clad on each side thereof with an aluminum outer layer of purity 99.0 to 99.99%. It should be noted that the aluminum purity mentioned herein is calculated from aluminum content by weight.

The composite foil of this invention thus consists of the relatively high purity aluminum core clad with the relatively low purity aluminum layer. The high occupancy of the plane (100) in this composite foil may be explained, but in no way limitted, as follows. During the final softening or recrystallization annealing after the final rolling in the manufacturing process for producing the clad composite foil, the cubic texture having crystals with the plane (100) parallel to the foil surface is dominantly formed in the core of relatively high purity aluminum wherein the occupancy of the plane (100) is primarily very high, and the crystals in the cubic texture thus formed in the core act as nuclei for crystals in the surrounding outer layer of relatively low purity aluminum, thereby preferentially growing the crystals with the plane (100) parallel to the foil surface in the outer layer.

The purity of aluminum in the core is preferably in the range of greater than 99.998%, more preferably greater than 99.999%. Below 99.995% of aluminum purity in the core, the predominant growing of crystals with the above-mentioned plane (100) is not expected in the outer layer. The preferential purity of aluminum in the outer layer is in the range of 99.85 to 99.99%, more preferably 99.93 to 99.99%. Regarding to the figure of 99.99% for the upper limit of purity of the outer layer, third digits of 4 and less after the decimal point are ignored.

The composite aluminum foil according to the present invention may be produced in an usual manner of manufacturing an aluminum foil except for cladding an aluminum material having purity greater than 99.995% for the core with an aluminum material having purity 99.0 to 99.99% for the outer layer. In this invention, the cladding of three layers may be carried out before feeding to the hot rolling or during the hot rolling. Care should be taken so that the aluminum materials be kept clean before the cladding. As an example, the overall thickness of the three-layers clad material may be 200 to 500 mm, which is hot rolled down to a thickness of 3 to 8 mm, cold rolled down to a thickness of 0.05 to 0.15 mm, and then subjected to the final annealing at a temperature of 300° to 600° C.

As described in the foregoings, the higher the purity of aluminum in the core, the more preferable results are expected. However, in the case wherein the core layer has a extremely high purity, for instance 99.999%, there may be occured a problem when a series of rollings particularly in the cold rolling operation is effected interruptedly, for instance, by using a single stand rolling mill, while there is no problem when those rollings are effected continuously, for instance, by using a tandem rolling mill. In the typical operation in the stage of cold rolling by the single stand mill, the series of rollings is carried out by stepwise at a temperature around 70° C., and one rolling step is occasionally interrupted by reason of working operation requirements, which results in mooring the rolled sheet or foil there before transferring to the subsequent rolling step. In such an interrupted rolling operation, as the aluminum of such high purity has a property of softening at the normal temperature, i.e., a property of softening after letting alone as it is for a certain period at the normal temperature due to its recrystallization temperature of less than the normal temperature, the recrystallization of the core is occasionally caused in the mooring period before the final softening or even before the final rolling step, which has been found to be resulted in that the finally obtainable occupancy of the plane (100) will not exceed the desired value. On the other hand, performed is the continuous operation in the stage of cold rolling by using the same single stand rolling mill without the foregoing interruption, and mooring, then such a problem does not occur.

In the course of developing the present invention, the inventors investigated to solve this problem by elevating the recrystallization temperature of the core having the high purity such as 99.999%, and have found that the incorporation of a slight amount of alloying element, copper and/or iron, into the core layer prevents the recrystallization of the core layer during the interrupted rolling operation while affording a desirable high occupancy of the plane (100) and a desirable mechanical strength which are the efficiencies sought by this invention. Further, it has been found that the core layer incorporated with the slight additive of copper and/or iron is effective in growing the crystals having the plane (100) in the outer layer even in the continuous operation of cold rolling as well as in the interrupted operation.

The incorporation amount of both or either of copper and iron is selected in the range of 10 to 40 ppm, preferably 20 to 40 ppm. The content amount (ppm) herein mentioned is calculated from the alloying element content by weight. Below 10 ppm of the alloying element, the occupancy of the plane (100) is extremely low when the above-mentioned interupted rolling operation is performed. Above 10 ppm the occupancy of the plane (100) rapidly increases, and in the range of 20 to 40 ppm there are expected both a remarkable occupancy of the plane (100) and a high mechanical stength of the foil. Additionally, in this preferable range the crystal grain formed is very fine and usually of less than 500μ in size. The content of above 40 ppm invites the decrease of aluminum purity of the core layer and makes the inherent efficiency of the core layer null and worthless. The aluminum purity of the core layer is displaced with 99.995 to 99.998% when the interrupted rolling operation is performed, while the aluminum purity of the outer layer is unchanged. Above 99.998% purity of the core, the interrupted rolling operation occasionally invites the recrystallization of the core before the final rolling step due to its softening property at the normal temperature.

In the composite foil according to this invention, as shown in the attached drawings and examples hereinafter mentioned, the occupancy of the crystallographic plane of Miller indices (100) is very high, and which therefore contributes largely to the enhancement of electrostatic capacitance of the electrolytic capacitor. In addition, as the foil has adequate mechanical strength, there is no difficulty in rolling as with mono-layer aluminum foil of purity 99.999% and it retains the sufficient foil strength even after etching. Therefore, the composite foil can be advantageously employed as electrode, especially anodic electrode, in the electrolytic capacitor, The present invention will be explained more in detail while referring to the attached drawings.

FIG. 1 illustrates the relation between the final annealing temperature, i.e., the final softenning temperature, and the occupancy of the plane (100).

In FIG. 1, the vertical axis shows the occupancy of the plane (100) whereas the horizontal axis shows the final annealing temperature. The dot marked with o corresponds to a composite aluminum foil according to this invention, of thickness 100μ, wherein the purity and thickness ratio of the three layers are 99.985%/99.999%/99.985% = 3/1/3. The dot marked with □ is also corresponding to a composite aluminum foil according to this invention, which has a core layer of aluminum purity 99.996% containing 30 ppm of copper and two outer layers of aluminum purity 99.98% in the ratio of thickness 2:1:2 and is formed by hot rolling at 300° C. with cladding and then cold rolling down to the final gage 100μ in the manner of the interrupted operation by using the single stand rolling mill, and subjecting to the final annealing. For comparison, mono-layer aluminum foils of purity 99.993% and 99.985% are shown in the same FIG. 1. The dot marked with x corresponds to the mono-layer aluminum foil of purity 99.993% and thickness 100μ, while the dot marked with ● corresponds to the mono-layer aluminum foil of purity 99.985% and thickness 100μ. The curves show the occupancy of the plane (100) when each foil has been annealed for three hours at various final softening temperature.

From FIG. 1, it is seen that the occupancy of the plane (100) increases overall as the final softening temperature rises. However, whereaas with the prior art mono-layer aluminum foil the occupancy tends to level off above 500° C. or more, the occupancy in the composite foil of this invention rises sharply at a softening temperature of approximately 300° C. and practically levels off above 350° C. or thereabouts. FIG. 1 thus shows that with the composite foil a high occupancy of the plane (100) is obtainable even at lower softening temperatures. This may be explained by the supposition that as the high purity aluminum core of this invention exhibits the property of recrystallization or recovery immediately after cold working, crystals with the plane (100) formed in the core act as nuclei and promote the preferencial growing of this crystal in the outer layer.

The occupancy of the plane (100) shown in the drawings and examples below was decided according to the "etch-pit method" wherein the chemical etching is carried out by immersion for 30 seconds in a chemical etching solution consisting of HCl, NHO₃ and HF in the proportions 5:5:1 by volume.

Figure 2:
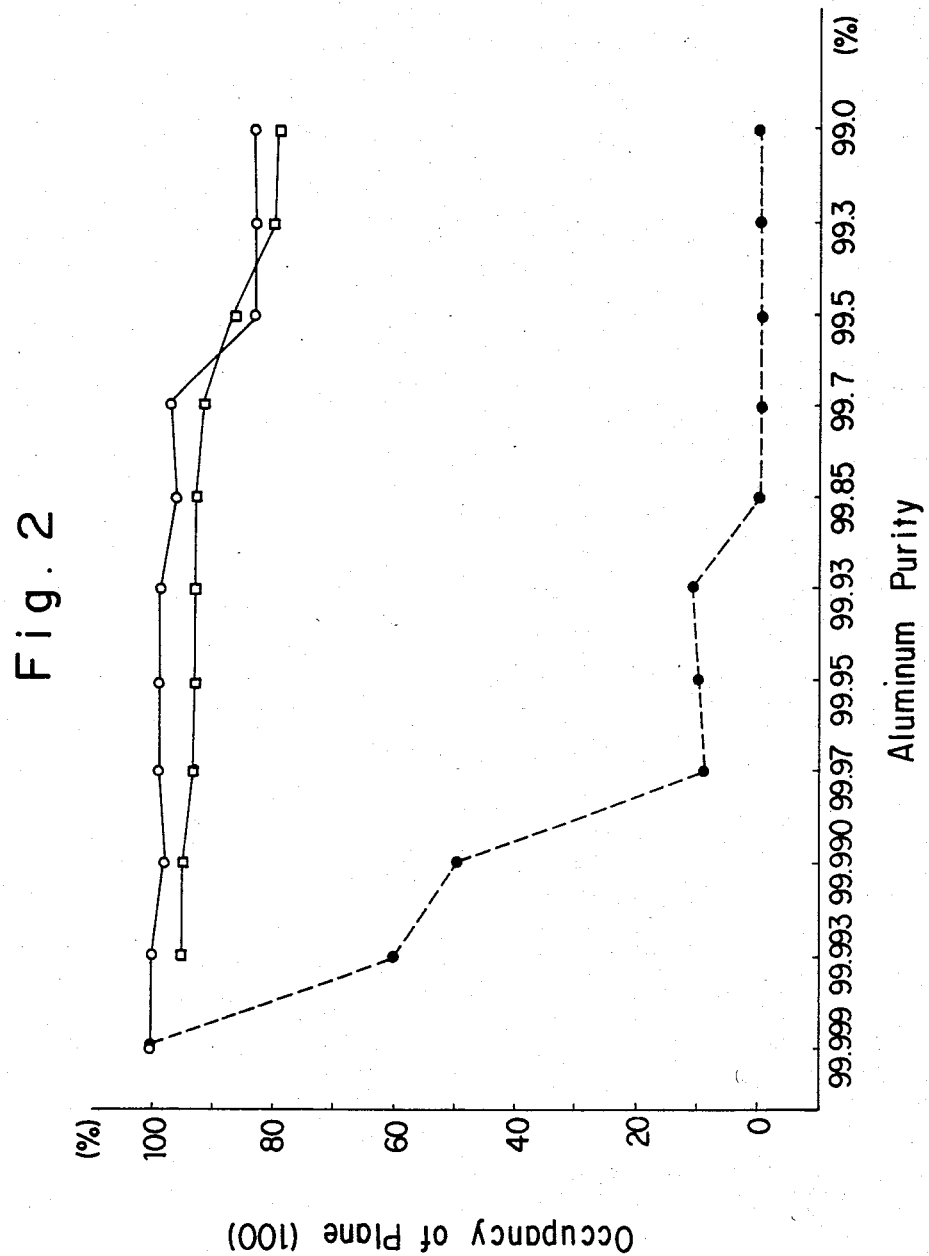

FIG. 2 illustrates the relation between aluminum purity and the occupancy of the plane (100).

In FIG. 2, the vertical axis shows the occupancy of the plane (100), and the horizontal axis shows the aluminum purity. In FIG. 2, the dot marked with o corresponds to the composite foil of this invention, wherein the purity of the core is 99.999% and that of the outer layer is given by the purity of the horizontal axis for each dot on the curve. The dot ● corresponds to the prior art mono-layer aluminum foil and its purity is given by the purity on the horizontal axis for each dot on the curve. The dot marked with □ is also corresponding to the composite foil produced in the manner of the interrupted cold rolling operation according to the invention, and has the core layer of aluminum purity 99.996% containing 30 ppm of copper and the outer layer of purity represented by the horizontal axis. The total thickness of each composite and mono-layer foils is of 100μ. Each layer of the three-layer composite foil of the mark o is of the same thickness, while the composite foil of the mark □ has a thickness ratio of outer layer/core layer/outer layer = 2:1:2.

From FIG. 2, it is seen that the occupancy of the plane (100) in the prior art mono-layer foil denoted by the mark ● decreases extremely with decreasing aluminum purity, while the occupancy in the composite foil denoted by the mark o or □ retains around 100%.

Another experiment of which results are not shown in FIG. 2 was carried out and three kinds of composite foils were produced, in which the core has a purity of 99.9988% as in this invention or 99.993% or 99.990% for comparison and the purity of the outer layer was all 99.990%. From this experiment it was revealed that the occupancy of the plane (100) in the composite foil having the core of purity 99.9988% reached 95% while those in the remaining comparative composite foils were 20% respectively. Further, from the measurement of the electrostatic capacitance by disposing each foil as an electrode in the electrolytic capacitor, it was revealed that the composite foil having the core purity 99.9988% enhanced it upto 5.8 μF/10cm², while the remaining two comparative foils showed 4.9 μF/10cm², respectively.

Figure 3:
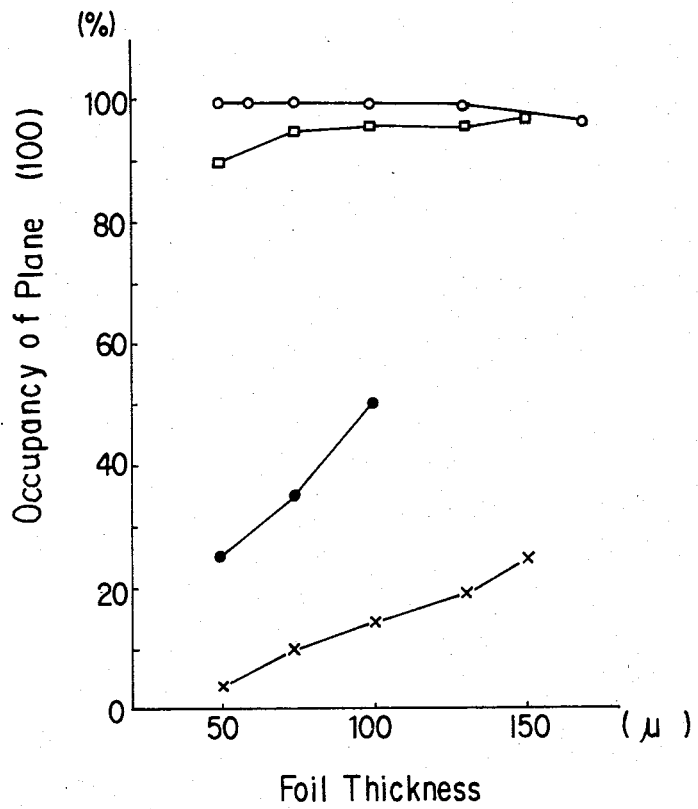

FIG. 3 illustrates the relation between the final thickness of the aluminum foil and the occupancy of the plane (100).

In FIG. 3, the vertical axis shows the occupancy of the plane (100) and the horizontal axis shows the final thickness. In this FIG. 3, the dot o corresponds to the composite foil of this invention wherein the purity and thickness of the three layers are respectively in the ratios of 99.990%/99.999%/99.990% = 5:2:5. The dot □ also corresponds to the composite foil according to the invention, which is produced by cold rolling the three-layer clad aluminum material in the interrupted manner by using the single stand rolling mill followed by subjecting to the final softening at 500° C. The composite foil denoted by the mark □ has the core of purity 99.996% containing 30 ppm of copper and the outer layer of purity 99.98% aluminum, the thickness ratio of the three layers being 2:1:2. The dot ● corresponds to the prior art mono-layer aluminum foil of purity 99.99%, and the dot x to the prior mono-layer foil of purity 99.98%.

From FIG. 3 it is seen that, compared to the prior art mono-layer aluminum foil which has a lesser occupancy of the plane (100) with decreasing the foil thickness, the composite foil of this invention retains the occupancy very high even if decreasing the total foil thickness.

Figure 4:
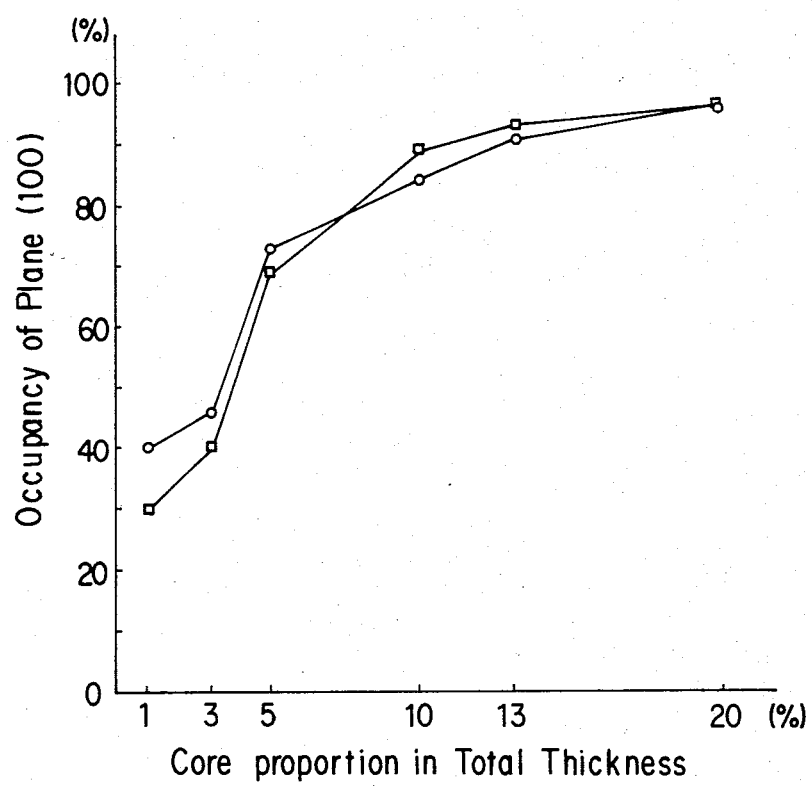

FIG. 4 illustrates the relation between the proportion of the core thickness in the total thickness of the composite foil and the occupancy of the plane (100).

In FIG. 4, the vertical axis shows the occupancy of the plane (100) and the horizontal axis shows the proportion of the core thickness (%). FIG. 4 indicates two kinds of composite foil according to this invention; the one denoted by the mark o has the core of purity 99.999% and the outer layer of purity 99.990% and the other denoted by the mark □ has the 99.996% purity core containing 30 ppm copper and the 99.98% purity outer layer, which was produced by using the single stand rolling mill in the manner of interrupted cold rolling operation. The thickness of the two outer layer is the same to each other in each composite foil and the total thickness of the composite foil is of 100μ.

From FIG. 4 it is seen that when the proportion of core thickness is very small, the high occupancy of the plane (100) is not expected, but if this proportion exceeds 5%, the occupancy increases remarkably. When the proportion exceeds 5%, the occupancy of the plane (100) is greater than 50%, when the porportion exceeds 10%, the occupancy is greater than 80%; when the proportion exceeds 20%, the occupancy is greater than 90%. As is clear from FIG. 4, the occupancy of the plane (100) in the composite foil increases with increasing proportion of the core thickness in the total foil thickness. There is not reason why there should be an upper limit to this proportion of the core thickness on technical grounds but, as high-purity aluminum is generally costly, the upper limit may be decided to be at most 50%, preferably 30%, more preferably 20% from the practical point of view.

Having described the basic concept of the present invention, reference is now made to the following examples, which are provided by way of illustration and not by way of limitation, of the practice of the invention.

Figure 5:
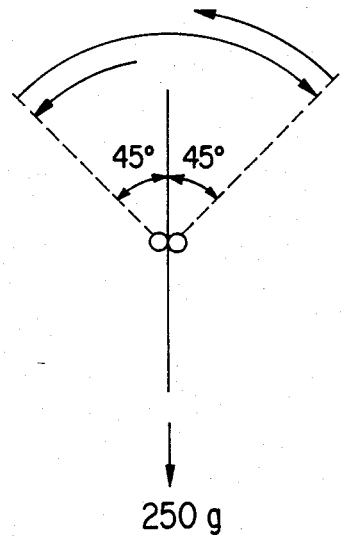

In the examples, the mechanical strength was evaluated be determining the folding endurance. A strip of 10 mm in width was cut out from a piece of foil after etching but before forming, and strained by a force of 250 g at its lower end as shown in FIG. 5. Taking the center of the strip as a pivot, the upper end of the strip was folded 45° from side to side, and the number of cycles was observed until it broke, one cycle constituting one folding movement to the left and right.

To measure the electrostatic capacitance, the electrolytic etching was first carried out on the composite foil for a predetermined time in 4.5% HCl at 80° C., using a D.C. current density of 15 A/dm$^2$, followed by forming in 5% ammonium borate at 80° C. with an applied potential of 380 vf.

EXAMPLE 1

A relatively high purity aluminum material for the core, which had a thickness of 80 mm and a chemical composition shown in Table 1 below, was clad on both sides with a relatively low purity aluminum material for the outer layer, which had a thickness of 160 mm, purity of aluminum 99.990% and unavoidable impurities of Fe 30 ppm, Si 20 ppm and Cu 50 ppm. The three-layers clad material was then fed to the hot-roll and hot rolled down to an overall thickness of 6 mm followed by cold rolling down to the final foil gage 100 μm by using a tandem rolling mill. The rolled foil thus obtained was further subjected to the final annealing in vacuo at 500° C. for three hours to produce the composite foil of this invention.

The occupancy of the plane (100) in this composite foil and it folding endurance after etching and its electrostatic capacitance were also listed in the following Table 1. For comparison, those of the mono-layer aluminum foil of purity 99.999% (unavoidable impurities; Fe 30 ppm, Si 20 ppm, Cu 50 ppm) and thickness 100 μm were indicated in Table 1.

TABLE 1

| Example No. | Chemical Composition | | | | Occupancy of plane (100) (%) | Electrostatic capacitance* ($\mu$F/10 cm$^2$) | Folding endurance* (cycle) |
| --- | --- | --- | --- | --- | --- | --- | --- |
| | Al (%) | Fe (ppm) | Cu (ppm) | Si (ppm) | | | |
| 1 | 99.999 | 4 | 2 | 4 | 98 | 5.43 | 28 |
| Comparison | 99.999 | 30 | 50 | 20 | 50 | 5.2 | 20 |

*Etching period was 6 min.

It is seen from the Table 1 that the composite foil of this invention is much superior to the prior mono-layer foil insofar as concerns the occupancy of the plane (100), folding endurance and electrostatic capacitance.

EXAMPLE 2

A three-layer composite foil was produced as in Example 1, which had the core layer of aluminum purity 99.999% (unavoidable impurities; Fe 4 ppm, Si 4 ppm, Cu 2 ppm) clad on both sides with the outer layer of aluminum purity 99.97% (unavoidable impurities; Fe 70 ppm, Si 60 ppm, Cu 170 ppm). The total thickness of the composite foil was 100μ, and the proportion of the core thickness in the total thickness was 10%.

The three-layer composite foil was etched for 4 min, 6 min, 8 min and 10 min, and then the folding endurance and electrostatic capacitance were measured. The results were shown in FIG. 6, wherein the dot o corresponded respectively, from left to right, to the foil etched for 4 min, 6 min, 8 min and 10 min.

Figure 6:
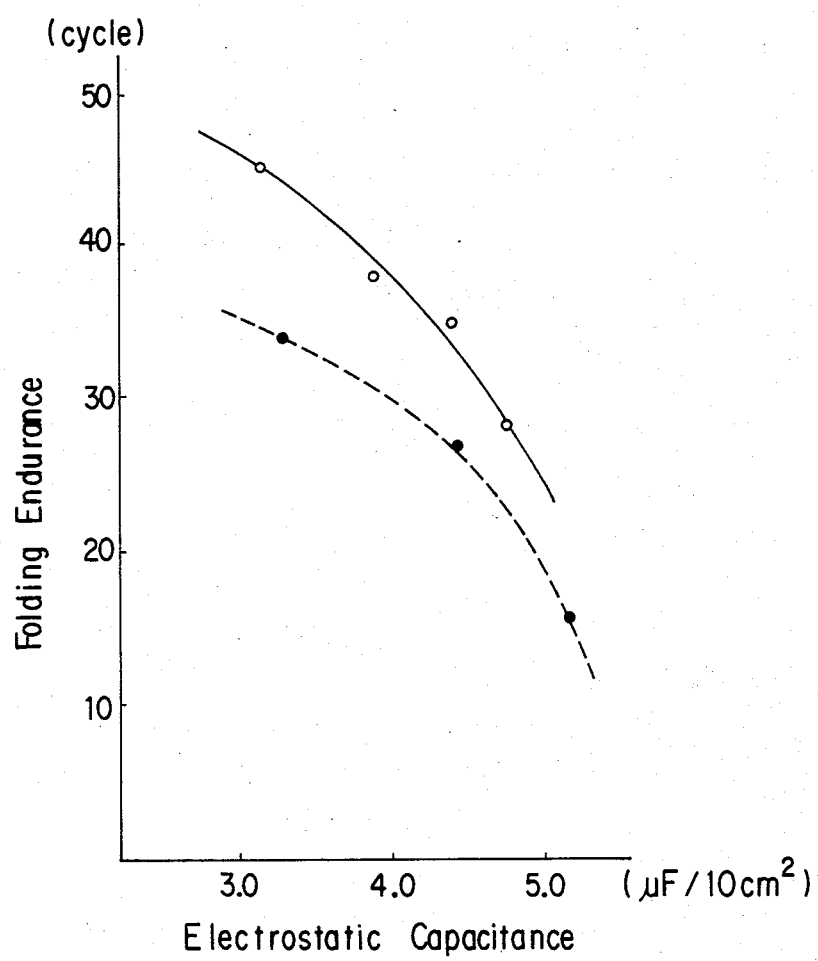

For comparison, in FIG. 6 indicated were the folding endurance and electrostatic capacitance of a mono-layer aluminum foil having a thickness of 100μ and a purity same as the above-mentioned outer layer of the composite foil. The mono-layer foil was previously etched for 4 min, 6 min and 8 min. In FIG. 6, the dot ● corresponded respectively, from left to right, to the mono-layer foil etched 4 min, 6 min and 8 min. When the comparative mono-layer foil was etched for 10 min, it dissolved completely.

From FIG. 6 it is seen that the composite foil of this invention is much superior to the prior mono-layer foil insofar as concerns both electrostatic capacitance and folding endurance.

EXAMPLE 3

A composite foil was produced, which consisted of the aluminum core layer having a chemical composition shown in Table 2 below and two alumimum outer layers having purity of 99.98%. The total thickness thereof was 100μ, and the proportion of each layer thickness was clad/core/clad=2:1:2.

In the production of the composite foil, the aluminum materials for each layer were clad into the three-layer structure and then heated at 300° C. for 5 min in an electric furnace. After hot rolling, it was cold rolled in a manner of the continuous rolling operation and interrupted rolling operation by using a single stand rolling mill. In the continuous operation, the mooring period from one rolling step to the subsequent rolling step was set within 30 sec at the normal temperature, on the other hand, in the interrupted operation, the mooring period was set to be 2 hours at the normal temperature. The final annealing in vacuo was effected on each foil at 500° C. for 3 hours.

Figure 7:
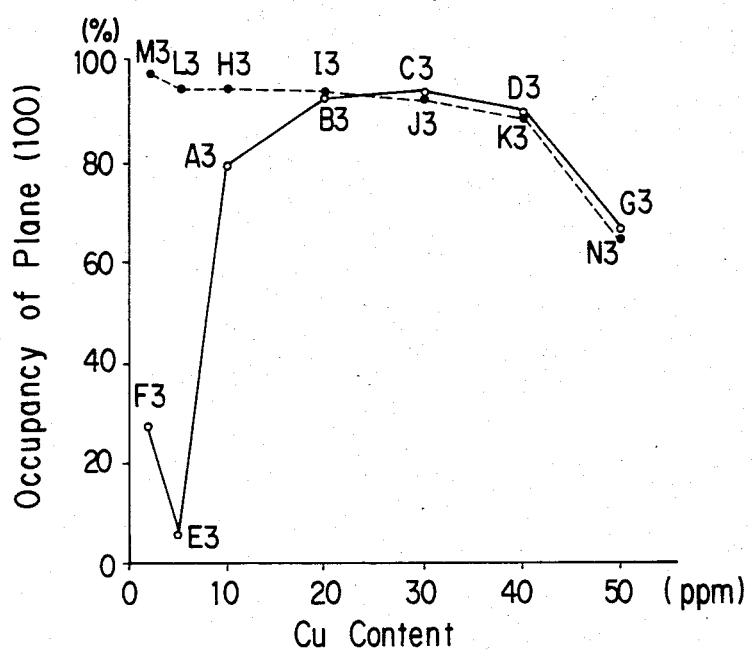

Measuring the properties of each foil, their electrostatic capacitance and folding endurance were shown in Table 2 and their occupancy of the plane (100) was shown in FIG. 7. In FIG. 7, the solid line represents the interrupted rolling operation and the dotted line represents the continuous rolling operation.

For comparison, measured were the electrostatic capacitance, folding endurance and occupancy of the plane (100) of the prior mono-layer aluminum foil of purity 99.98% (unavoidable impurities; Fe 60 ppm, Cu 50 ppm) which were produced similarly by the continuous operation and interrupted operation in the stage of the cold rolling. The results were that the electrostatic capacitance was 5.2 μF/10cm$^2$, the folding endurance was 18 cycle and the occupancy of the plane (100) was 15% both in the continuous and interrupted operations.

TABLE 2

| | Chemical Composition of Core | | Electrostatic Capacitance ($\mu F/10$ cm$^2$) | Folding Endurance (cycle) |
|---|---|---|---|---|
| | Al (%) | Cu (ppm) | | |
| Interrupted Operation | | | | |
| A3 | 99.998 | 10 | 5.6 | 25 |
| B3 | 99.997 | 20 | 5.8 | 25 |
| C3 | 99.996 | 30 | 5.8 | 24 |
| D3 | 99.995 | 40 | 5.8 | 23 |
| Comparison E3 | 99.999 | 5 | 4.5 | 25 |
| Comparison F3 | 99.999 | 2 | 4.6 | 25 |
| Comparison G3 | 99.993 | 50 | 5.3 | 24 |
| Continuous Operation | | | | |
| H3 | 99.998 | 10 | 5.7 | 25 |
| I3 | 99.997 | 20 | 5.8 | 25 |
| J3 | 99.996 | 30 | 5.8 | 25 |
| K3 | 99.995 | 40 | 5.8 | 25 |
| L3 | 99.999 | 5 | 5.7 | 25 |
| M3 | 99.999 | 2 | 5.8 | 25 |
| Comparison N3 | 99.993 | 50 | 5.3 | 23 |

EXAMPLE 4

A composite foil was produced as in Example 3 in the manner of the continuous and interrupted rolling operations in the stage of cold rolling, which consisted of the aluminum core layer having a chemical composition shown in Table 3 below and two aluminum outer layers having purity of 99.98%. The total thickness thereof was 100$\mu$, and the proportion of each layer thickness was 2:1:2.

Figure 8:
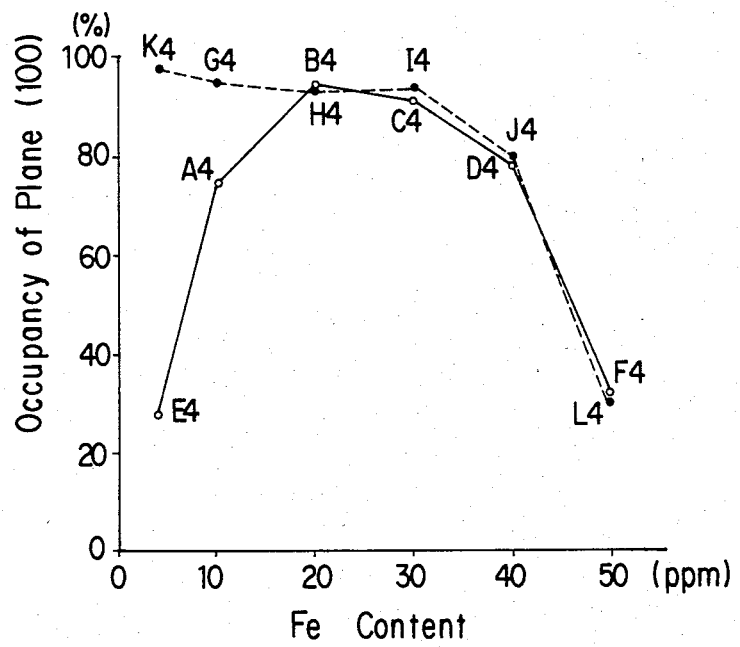

The properties of the obtained foil were listed in Table 3 and in FIG. 8.

TABLE 3

| | Chemical Composition of Core | | Electrostatic Capacitance ($\mu F/10$ cm$^2$) | Folding Endurance (cycle) |
|---|---|---|---|---|
| | Al (%) | Cu (ppm) | | |
| Interrupted Operation | | | | |
| A4 | 99.998 | 10 | 5.6 | 25 |
| B4 | 99.997 | 20 | 5.8 | 23 |
| C4 | 99.996 | 30 | 5.8 | 24 |
| D4 | 99.995 | 40 | 5.7 | 23 |
| Comparison E4 | 99.999 | 5 | 4.7 | 25 |
| Comparison F4 | 99.993 | 50 | 5.2 | 23 |
| Continuous Operation | | | | |
| G4 | 99.998 | 10 | 5.7 | 23 |
| H4 | 99.997 | 20 | 5.8 | 25 |
| I4 | 99.996 | 30 | 5.8 | 25 |
| J4 | 99.995 | 40 | 5.7 | 23 |
| K4 | 99.999 | 5 | 5.7 | 25 |
| Comparison L4 | 99.993 | 50 | 5.1 | 23 |

EXAMPLE 5

A composite foil was produced as in Example 3 in the manner of the continuous and interrupted rolling operations in the stage of cold rolling, which consisted of the core layer having the chemical composition shown in Table 4 below and two outer layers having the purity of 99.98%. The total thickness thereof was 100$\mu$, and the proportion of each layer thickness was 2:1:2.

Figure 9:
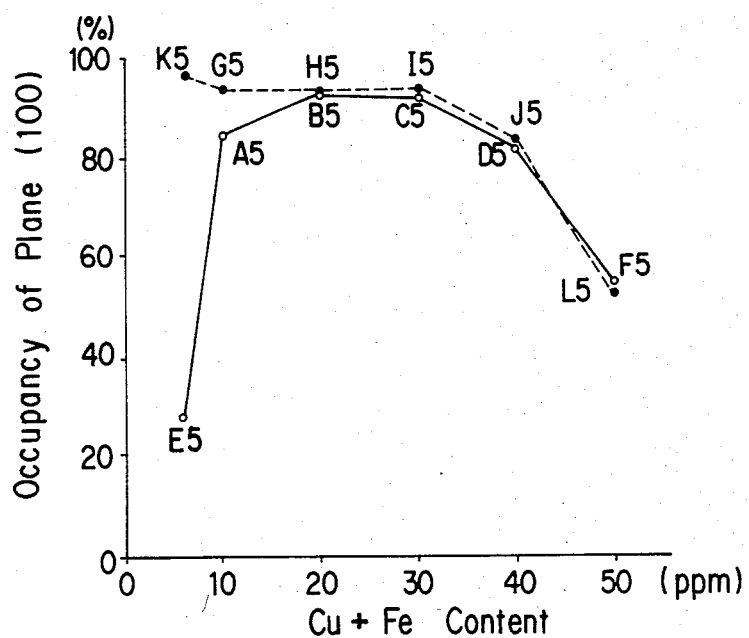

The properties of each foil were measured and listed in Table 4 in FIG. 9.

TABLE 4

| | Chemical Composition of Core | | | Electrostatic Capacitance ($\mu F/10$ cm$^2$) | Folding Endurance (cycle) |
|---|---|---|---|---|---|
| | Al (%) | Cu (ppm) | Fe (ppm) | | |
| Interrupted Operation | | | | | |
| A5 | 99.998 | 6 | 4 | 5.6 | 25 |
| B5 | 99.997 | 13 | 7 | 5.9 | 25 |
| C5 | 99.996 | 20 | 10 | 5.8 | 25 |
| D5 | 99.995 | 20 | 20 | 5.8 | 24 |
| Comparison E5 | 99.999 | 2 | 4 | 4.6 | 25 |
| Comparison F5 | 99.993 | 30 | 20 | 5.2 | 24 |
| Continuous Operation | | | | | |
| G5 | 99.998 | 6 | 4 | 5.7 | 25 |
| H5 | 99.997 | 13 | 7 | 5.8 | 25 |
| I5 | 99.996 | 20 | 10 | 5.7 | 24 |
| J5 | 99.995 | 20 | 20 | 5.7 | 23 |
| K5 | 99.999 | 2 | 4 | 5.8 | 25 |
| Comparison L5 | 99.993 | 30 | 20 | 5.0 | 23 |

EXAMPLE 6

A three-layer composite foil was produced as in Example 3 in the manner of the interrupted rolling operaiton in the stage of cold rolling, which has the core layer of aluminum purity 99.996% containing 30 ppm of copper clad on both sides with the outer layer of aluminum purity 99.98%. The total thickness of the composite foil was 100$\mu$, and the proportion of the core thickness in the total thickness was 10%.

The three-layer composite foil was etched for 4 min, 6 min, 8 min and 10 min, and then the folding endurance and electrostatic capacitance were measured. The results were shown in FIG. 10, wherein the dot o corresponded respectively, from left to right, to the foil etched for 4 min, 6 min, 8 min and 10 min.

Figure 10:
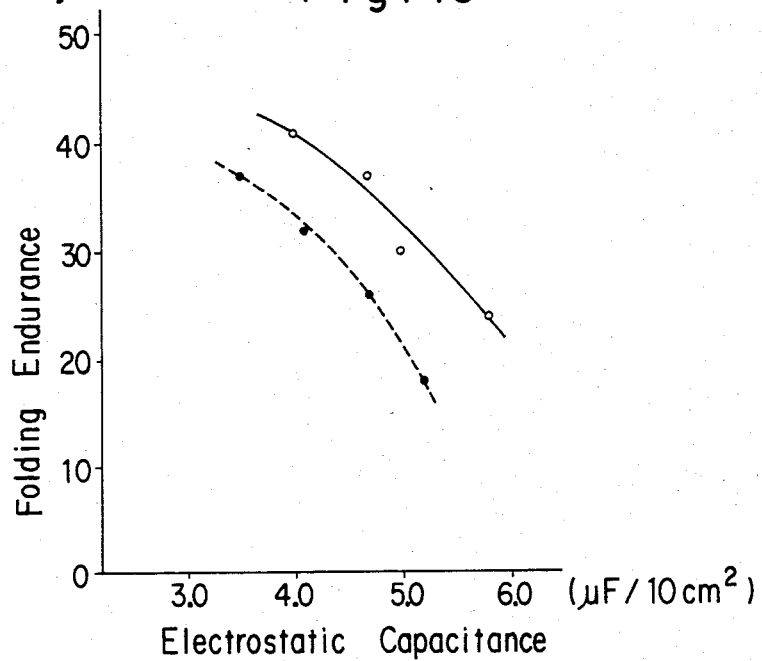

For comparison, in FIG. 10 indicated were the folding endurance and electrostatic capacitance of a mono-layer aluminum foil having a thickness of 100$\mu$ and a purity same as the above-mentioned outer layer of the composite foil. The mono-layer foil was previously etched for 4 min, 6 min, 8 min and 10 min. In FIG. 10, the dot ● corresponded respectively, from left to right, to the mono-layer foil etched 4 min, 6 min, 8 min and 10 min.

From FIG. 10, it is seen that the composite foil of this invention is much superior to the prior mono-layer insofar as concerns both electrostatic capacitance and folding endurance.

What is claimed is:

1. A composite aluminum foil for use as an electrode in an electrolyte capacitor, having an aluminum core layer of purity greater than 99.995% clad on each side with an aluminum outer layer of purity 99.0 to 99.99%, which has a rich proportion of a cubic texture.

2. A composite foil as claimed in claim 1 wherein the core layer has an aluminum purity greater than 99.998%.

3. The composite foil of claim 2 wherein said aluminum purity is greater than 99.999%.

4. A composite aluminum foil for use as an electrode in an electrolytic capacitor, having an aluminum core layer of purity 99.995 to 99.998% containing 10 to 40 ppm of both or either of copper and iron clad on each side with an aluminum outer layer of purity 99.0 to 99.99%, which has a rich proportion of a cubic texture.

5. A composite foil as claimed in claim 4 wherein the core layer contains 20 to 40 ppm of both or either of copper and iron.

6. A composite foil as claimed in claim 1 or 4 wherein the outer layer has an aluminum purity of 99.85 to 99.99%.

7. The composite foil of claim 6 wherein said aluminum purity is of 99.93 to 99.99%.

8. A composite foil as claimed in claim 1 or 4 wherein the thickness of the core layer constitutes more than 5% of the total thickness of the foil.

9. A composite foil as claimed in claim 8 wherein the thickness of the core layer constitutes more than 10% of the total thickness of the foil.

10. The composite foil of claim 9 wherein the thickness of the core layer constitutes more than 20% of the total thickness of the foil.

11. A composite foil as claimed in claim 1 or 4 wherein the crystallographic plane of Miller indices (100) substantially parallel to the surface of the foil has an occupancy of more than 50%.

12. A composite foil as claimed in claim 11 wherein the crystallographic plane of Miller indices (100) substantially parallel to the surface of the foil has an occupancy of more than 80%.

13. The composite foil of claim 12 wherein said occupancy is more than 90%.

14. A composite foil as claimed in claim 1 or 4 which is further etched.

* * * * *

UNITED STATES PATENT AND TRADEMARK OFFICE
CERTIFICATE OF CORRECTION

PATENT NO. : 4,510,207
DATED     : April 9, 1985
INVENTOR(S) : Masashi Mehada et al It is certified that error appears in the above-identified patent and that said Letters Patent is hereby corrected as shown below:

At column 1, line 42, change "ahd" to --and--;

At column 2, line 36, change "nun" to --num--;

At column 4, line 50, change "," to --.--;

At column 5, line 15, change "whereaas" to --whereas--;

At column 7, line 41, change "99.999" to --99.990--;

At column 7, Table 1, change "Comparison 99.999" to --Comparison 99.990--; and

At column 9, Table 3, change "Cu" to --Fe--.

Signed and Sealed this

Fourteenth Day of January 1986

[SEAL]

Attest:

DONALD J. QUIGG

Attesting Officer

Commissioner of Patents and Trademarks